(12) United States Patent
Di Censo et al.

(10) Patent No.: US 10,318,016 B2
(45) Date of Patent: Jun. 11, 2019

(54) HANDS FREE DEVICE WITH DIRECTIONAL INTERFACE

(71) Applicant: Harman International Industries, Incorporated, Stamford, CT (US)

(72) Inventors: Davide Di Censo, San Mateo, CA (US); Stefan Marti, Oakland, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 504 days.

(21) Appl. No.: 14/294,328

(22) Filed: Jun. 3, 2014

(65) Prior Publication Data

US 2015/0346845 A1     Dec. 3, 2015

(51) Int. Cl.
| | |
|---|---|
| G06F 16/00 | (2019.01) |
| G06F 3/0346 | (2013.01) |
| G06F 3/16 | (2006.01) |
| G06F 3/01 | (2006.01) |

(52) U.S. Cl.
CPC ............ G06F 3/0346 (2013.01); G06F 3/012 (2013.01); G06F 3/013 (2013.01); G06F 3/167 (2013.01)

(58) Field of Classification Search
CPC .. G06F 3/0346; G06F 3/167; G06F 17/30392; G06F 17/30395; G06F 17/30716; G06F 17/30554; G06F 17/30696; G06F 17/30651; G06F 3/012; G06F 3/013; G06F 16/2423; G06F 16/2425; G06F 16/248; G06F 16/338; G06F 16/34
See application file for complete search history.

(56) References Cited

U.S. PATENT DOCUMENTS

| | | | |
|---|---|---|---|
| 5,454,106 A * | 9/1995 | Burns ............... | G06F 17/30392 |
| 6,118,888 A | 9/2000 | Chino et al. | |
| 6,701,294 B1 * | 3/2004 | Ball ................. | G06F 17/30392 |
| | | | 704/257 |
| 7,359,782 B2 * | 4/2008 | Breed ................ | B60R 21/0134 |
| | | | 180/274 |

(Continued)

FOREIGN PATENT DOCUMENTS

| | | |
|---|---|---|
| CN | 1918539 A | 2/2007 |
| CN | 101515197 A | 8/2009 |

(Continued)

OTHER PUBLICATIONS

Pingali et al., Steerable Interfaces for Pervasive Computing Spaces, 8 pages (Year: 2003).*

(Continued)

*Primary Examiner* — Noosha Arjomandi
(74) *Attorney, Agent, or Firm* — Artegis Law Group, LLP

(57) ABSTRACT

Embodiments provide a non-transitory computer-readable medium containing computer program code that, when executed, performs an operation. The operation includes detecting a user action requesting an interaction with a first device and originating from a source. Additionally, embodiments determine a direction in which the source is located, relative to a current position of the first device. A response to the user action is also determined, based on a current state of the first device. Embodiments further include outputting the determined response substantially in the determined direction in which the source is located.

22 Claims, 5 Drawing Sheets

(56) References Cited

U.S. PATENT DOCUMENTS

| | | | | |
|---|---|---|---|---|
| 7,546,242 | B2* | 6/2009 | Chevallier | G06F 3/04815 |
| | | | | 704/245 |
| 8,296,383 | B2* | 10/2012 | Lindahl | G10L 15/30 |
| | | | | 709/206 |
| 8,370,423 | B2* | 2/2013 | Ozzie | G06F 17/30578 |
| | | | | 709/203 |
| 8,700,392 | B1 | 4/2014 | Hart et al. | |
| 9,262,612 | B2* | 2/2016 | Cheyer | G06F 21/32 |
| 9,304,736 | B1* | 4/2016 | Whiteley | G06F 3/167 |
| 9,319,782 | B1* | 4/2016 | Crump | H04R 3/02 |
| 9,659,577 | B1* | 5/2017 | Langhammer | G10L 21/06 |
| 2001/0034250 | A1* | 10/2001 | Chadha | G06F 1/1616 |
| | | | | 455/566 |
| 2002/0177928 | A1* | 11/2002 | Moriguchi | H04M 1/6091 |
| | | | | 701/1 |
| 2004/0121819 | A1* | 6/2004 | Vogel | H04B 1/3883 |
| | | | | 455/569.2 |
| 2006/0209013 | A1* | 9/2006 | Fengels | G06F 3/0325 |
| | | | | 345/156 |
| 2008/0133230 | A1* | 6/2008 | Herforth | G01C 21/26 |
| | | | | 704/235 |
| 2009/0117945 | A1* | 5/2009 | Mahler | H04M 1/6041 |
| | | | | 455/569.1 |
| 2009/0280870 | A1* | 11/2009 | Muttschall | B60R 11/0241 |
| | | | | 455/569.2 |
| 2009/0315715 | A1* | 12/2009 | Larsen | H04L 67/125 |
| | | | | 340/568.1 |
| 2010/0121636 | A1* | 5/2010 | Burke | G06F 3/0346 |
| | | | | 704/233 |
| 2011/0060793 | A1* | 3/2011 | Wheeler | G06Q 10/00 |
| | | | | 709/203 |
| 2012/0036433 | A1* | 2/2012 | Zimmer | G06T 15/20 |
| | | | | 715/702 |
| 2012/0050455 | A1* | 3/2012 | Santamaria | H04L 61/256 |
| | | | | 348/14.11 |
| 2012/0140918 | A1* | 6/2012 | Sherry | H04M 9/082 |
| | | | | 379/406.08 |
| 2012/0197864 | A1* | 8/2012 | Bourdoncle | G06F 17/30392 |
| | | | | 707/711 |
| 2012/0252370 | A1* | 10/2012 | Nagamatsu | H04M 1/6075 |
| | | | | 455/67.13 |
| 2012/0299950 | A1* | 11/2012 | Ali | G02B 27/0176 |
| | | | | 345/592 |
| 2013/0116012 | A1* | 5/2013 | Okayasu | H04M 1/6091 |
| | | | | 455/566 |
| 2013/0119255 | A1* | 5/2013 | Dickinson | G04G 21/00 |
| | | | | 250/340 |
| 2013/0254525 | A1* | 9/2013 | Johnson | G06F 3/012 |
| | | | | 713/100 |
| 2013/0321265 | A1* | 12/2013 | Bychkov | G06F 3/013 |
| | | | | 345/156 |
| 2014/0278439 | A1* | 9/2014 | Rajagopal | G10L 15/01 |
| | | | | 704/275 |
| 2015/0002808 | A1* | 1/2015 | Rizzo, III | A61F 9/08 |
| | | | | 351/158 |
| 2015/0161992 | A1 | 6/2015 | Jung | |
| 2016/0012132 | A1* | 1/2016 | Que | G06F 3/0482 |
| | | | | 707/706 |

FOREIGN PATENT DOCUMENTS

| | | |
|---|---|---|
| CN | 103049077 A | 4/2013 |
| JP | 2005-313291 A | 11/2005 |
| JP | 2008-097571 A | 4/2008 |
| JP | 2008205896 A | 9/2008 |
| JP | 2010156825 A | 7/2010 |
| KR | 100853234 B1 | 8/2008 |
| KR | 1020140007282 A | 1/2014 |

OTHER PUBLICATIONS

David Zlotnick, Method and system for transmitting and/or receiving audio signals with a desired direction; 16 pages (Year: 2004).*

Apple Inc.; "iOS7", retrieved Apr. 3, 2014, pp. 1-5, <http://www.apple.com/ios/siri/>.

Xuuk inc.; "eyebox2", retrieved Apr. 3, 2014, pp. 1-2, <http://www.xuuk.com/eyebox2/>.

Google; "Google Mobile Search", retrieved Apr. 3, 2014, pp. 1-7, <http://www.google.com/mobile/search>.

Holsonic Research Labs, Inc., "audio spot light", retrieved Apr. 3, 2014, pp. 1-2, <http://www.holosonics.com/>.

"Robin—your personal eyes-free assistant on the road!", retrieved Apr. 3, 2014, pp. 1-2, <http://www.robingets.me/>.

Sensory, Inc.; "Embedded Speech Technologies for Consumer Electronics", retrieved Apr. 3, 2014, pp. 1-2, <www.sensoryinc.com/>.

Sensory Inc.; "Hear Me >> truly hands-free", pp. 1-4, retrieved Apr. 3, 2014, <http://sensoryinc.com/blog/?tag=truly-hands-free>.

Tobii Technology; "Tobii Technology—world leader in eye tracking and gaze interaction", pp. 1-2, retrieved Apr. 3, 2014, <http://www.tobii.com/>.

International Search Report for PCT Application No. PCT/US2015/033599, dated Aug. 21, 2015.

Partial Supplementary European Search Report for Application No. 15802793.8 dated Jan. 18, 2018.

Extended European Search Report for Application No. 15802793.8 dated May 2, 2018.

* cited by examiner

HANDS FREE DEVICE WITH DIRECTIONAL INTERFACE

BACKGROUND

Field of the Invention

Embodiments generally relate to interfaces for devices, and more specifically to techniques for providing a directional interface that enables hands-free operation of a device.

Description of the Related Art

Today interconnected devices are more common than ever before and the popularity of such devices is continuing to increase at a rapid pace. For instance, it is not uncommon for a person to have a mobile device (e.g., a smart phone), a television, a tablet computing device, a media player and a vehicle navigation system. As more and more devices are built with the capability and logic to communicate with other devices, new possibilities are unlocked for providing a completely integrated experience for a user.

Traditionally, users can interact with such devices using a number of input mechanisms. Examples of these input mechanisms include buttons on the device, a keyboard, a touchscreen interface, a remote control, and so on. More recently, devices have been built that allow a user to communicate audibly with the device through speech recognition, e.g., where the user speaks a voice command to be carried out by the device. Such devices offer many conveniences for users, such as the ability to input lengthy strings of data by simply speaking to the device. However, many such devices still rely on traditional input mechanisms to trigger the speech-recognition mode. For example, a device may require a user to press a certain button on the device, in order to put the device in a speech-recognition mode. Thus, these devices do not offer a true hands-free experience.

SUMMARY

One embodiment provides a non-transitory computer-readable medium containing computer program code that, when executed, performs an operation. The operation includes detecting a user action requesting an interaction with a first device and originating from a source location. Additionally, the operation includes determining a direction in which the source location is located, relative to a current position of the first device. The operation also includes determining a response to the user action, based on a current state of the first device. Further, the operation includes outputting the determined response substantially in the determined direction in which the source location is located.

Another embodiment provides a non-transitory computer-readable medium containing computer program code that, when executed, performs an operation. The operation includes detecting a triggering event comprising at least one of (i) detecting a voice trigger and (ii) detecting a user gaze in a direction of the first device. Additionally, the operation includes determining a direction to a source of the triggering event, relative to a current position of the first device. The operation further includes initiating an interactive voice dialogue by outputting an audible response as a steerable sound beam substantially in the determined direction in which the source of the triggering event is located.

Yet another embodiment provides an apparatus that includes a computer processor and a memory containing a program that, when executed by the computer processor, performs an operation. The operation includes detecting a user action originating from a source location. Additionally, the operation includes determining a direction in which the source location is located, relative to a current position of the apparatus. The operation further includes determining a response to the user action. The operation also includes outputting the determined response substantially in the determined direction in which the source location is located.

DETAILED DESCRIPTION

Figure 1:
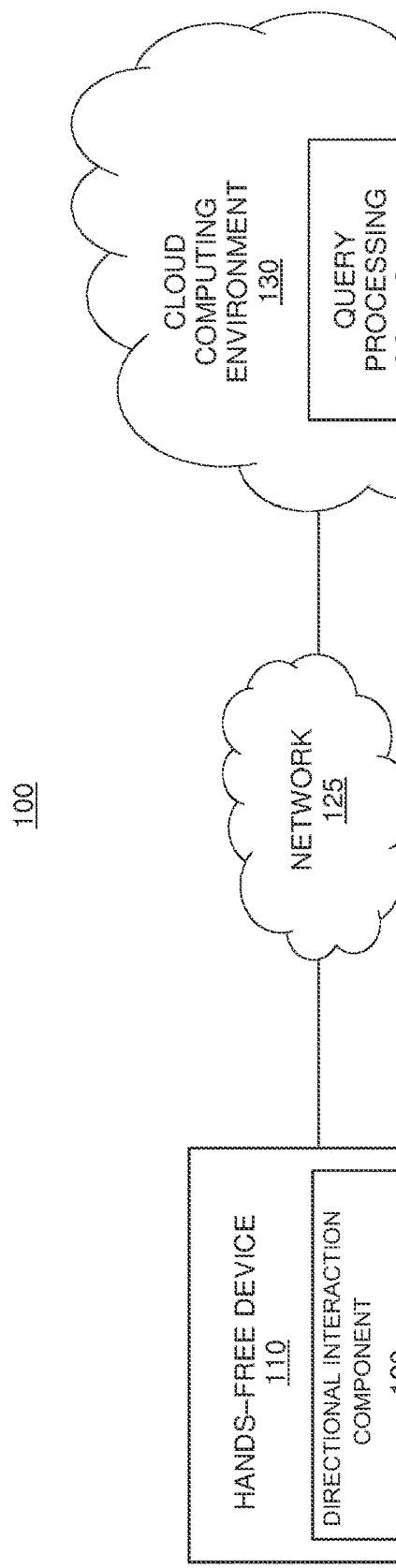
FIG. 1 is a block diagram illustrating a system that includes a hands-free device configured with a directional interaction component, according to one embodiment described herein.

While many devices today enable a user to input commands and other data through the use of speech recognition technology, these devices still require the user to put the device in a speech recognition mode by way of another input mechanism. For example, a mobile device may enable a user to speak a text string for use in sending a Short Message Service (SMS) message, but the user may be required to hold a particular button on the mobile device for a predetermined period of time first in order to put the mobile device in a speech recognition mode. As another example, a vehicle may include logic that allows a user to enter address information into the vehicle's navigation system by speaking the address information aloud. However, the user may be required to first depress a button on the steering wheel of the vehicle and navigate a menu system before the user can speak the address information for input. Thus, these conventional devices do not offer a truly hands-free experience for the user, as they still require the user to place the device in a speech recognition mode through the use of a manual input mechanism (e.g., a button on the device).

As such, embodiments provide techniques for providing a completely hands-free experience for a user of a device. For instance, embodiments can detect a user action performed by a first user requesting an interaction with a first device. According to one embodiment, the user action could be an audible command spoken by the user. In another embodiment, the user action could be the user looking directly at the device. Embodiments could then determine a direction in which the first user is located, relative to a current position of the device. Thus, if the user action comprises the user speaking an audible command to the device, logic on the device could process sound data from each of a plurality of microphones on the device in order to determine a direction in which the audible command originated. As another example, where the user action represents the user looking directly at the device, logic on the device could analyze images collected from one or more cameras of the device, and could determine the direction in which the user is located relative to the device based on the analyzed images and predefined data specifying the positions of the various cameras on the device.

Embodiments can then determine an audible response to the user action, based on a current state of the first device. For example, logic on the device could determine that the device is currently in a sleep state and, upon detecting the user is looking in the direction of the device, the logic could determine the appropriate audible response is to ask the user "How can I assist you today?" The determined audible response can also be determined based on content specified in the user action. Thus, for example, where the user action represents an audible command spoken by the user, logic on the device could analyze the audible command and could determine that the user is requesting a particular piece of information. The logic could then generate a query configured to retrieve the particular piece of information, transmit the query for execution, receive the corresponding query results and generate the audible response based on the received query results. For example, if the logic determines that the user action is requesting the date of Thanksgiving in 2014, the logic could retrieve this information and could generate an audible response that says "Thanksgiving this year falls on November 27."

Embodiments can then output the determined audible response as a steerable sound beam in the determined direction in which the first user is located. For example, the device could be configured with a beam forming speaker array or an actuated direction speaker than can be configured to transmit audio waves directed in a specific direction, and the logic on the device could configure these audio output devices to transmit the audible response in the direction from which the user action was received (i.e., the direction the user is located in, relative to the device). Doing so enables the audible response to be substantially audible only to the user or other users in the immediate vicinity.

FIG. 1 is a block diagram illustrating a system that includes a hands-free device configured with a directional interaction component, according to one embodiment described herein. As shown, the system 100 includes a hands-free device 110 configured with a directional interaction component 120 and a cloud computing environment 130 that includes a query processing component 140, interconnected via a network 125. Generally, the directional interaction component 120 is configured to (a) detect a user action coming from a certain direction, relative to a device on which the directional interaction component 120 resides, and then to (b) provide an audible response to the user action oriented in the direction. For instance, examples of the user action include, without limitation, a voice instruction spoken by the user (e.g., detected by analyzing audio data recorded using a microphone device(s) of the hands-free device 110) and the user looking in the direction of the hands-free device 110 (e.g., detected by analyzing images captured by a camera device(s) of the hands-free device 110).

The audible response provided by the directional interaction component 120 can vary depending on the user request. For example, if the user poses a specific question in the voice instruction (e.g., "when is Thanksgiving 2014?"), the directional interaction component 120 could detect the user's voice instruction using one or more microphone devices and could analyze the data collected from these microphone devices to determine the user's question (e.g., using speech recognition technology). The directional interaction component 120 could then attempt to determine an answer to the specific question and the directional interaction component 120 could present this answer as the response. For example, the directional interaction component 120 could generate a query configured to return an answer for the specific question specified by the voice instruction. The directional interaction component 120 could submit the generated query to the query processing component 140, which could execute the query and could return query results to the directional interaction component 120.

Upon receiving the query results, the directional interaction component 120 could generate an audible response and could present this response to the user. For example, the directional interaction component 120 could apply a text-to-speech conversion algorithm to a portion of the query results in order to generate an audible response to the user's voice instruction (e.g., "Thanksgiving will be on Nov. 27, 2014"). The directional interaction component 120 can then output the audible response using one or more audio output devices of the hands-free device.

In one embodiment, the directional interaction component 120 is configured to output the audible response as a steerable beam of sound aimed in the direction of the user, relative to the position of the hands-free device 110, e.g., using an ultra-directional speaker(s). For instance, the directional interaction component 120 could determine the direction the user is located in by capturing the user's image using one or more camera devices and could identify the user within the capture images (e.g., using facial recognition techniques). The directional interaction component 120 could then determine the direction the user is located in, based on the user's position within the captured images and information specifying the location of the corresponding camera devices. The directional interaction component 120 could then output the audible response using a beam forming speaker array in the determined direction, such that only the user and others in the user's immediate vicinity can hear the audible response. The directional interaction component 120 can be configured to continuously track the direction the user is currently located in, relative to the position of the hands-free device 110, so that sound beams projected from the hands-free device are continuously projected in the user's direction.

In one embodiment, the directional interaction component 120 is configured to constantly listen for voice commands from the user by constantly monitoring the audio data collected from the various microphone devices. In a particular embodiment, the directional interaction component 120 is configured to maintain a sleep state until the directional interaction component 120 detects the user has glanced in the direction of the hands-free device 110. For instance, the directional interaction component 120 could monitor images captured by one or more camera devices of the hands-free device 110 and could perform a facial recognition analysis on the captured images to determine when the user is looking directly at the hands-free device 110. Upon detecting the user is looking at the device 110, the directional interaction component 120 could then leave the sleep state and could begin actively listening for voice commands from the user. In a particular embodiment, the directional interaction component 120 is configured to listen for a particular voice trigger (e.g., a word or phrase spoken by a particular user's voice), and the directional interaction component 120 is configured to maintain its sleep state until the voice trigger is detected.

Additionally, the directional interaction component 120 may be configured to perform authentication and authorization operations for the user, before responding to a request from the user. For example, the directional interaction component 120 could perform a voice signature analysis on the data collected from the microphones of the hands-free device 110 to ensure that the voice matches a known and sufficiently authorized user. As another example, the directional interaction component 120 could perform a facial feature recognition analysis (e.g., using one or more camera devices of the hands-free device 110, using a sensor that recognizes the user's facial features such as retinal patterns at a distance, etc.) to ensure that the user speaking to the hands-free device is a known and sufficiently authorized user.

Figure 2:
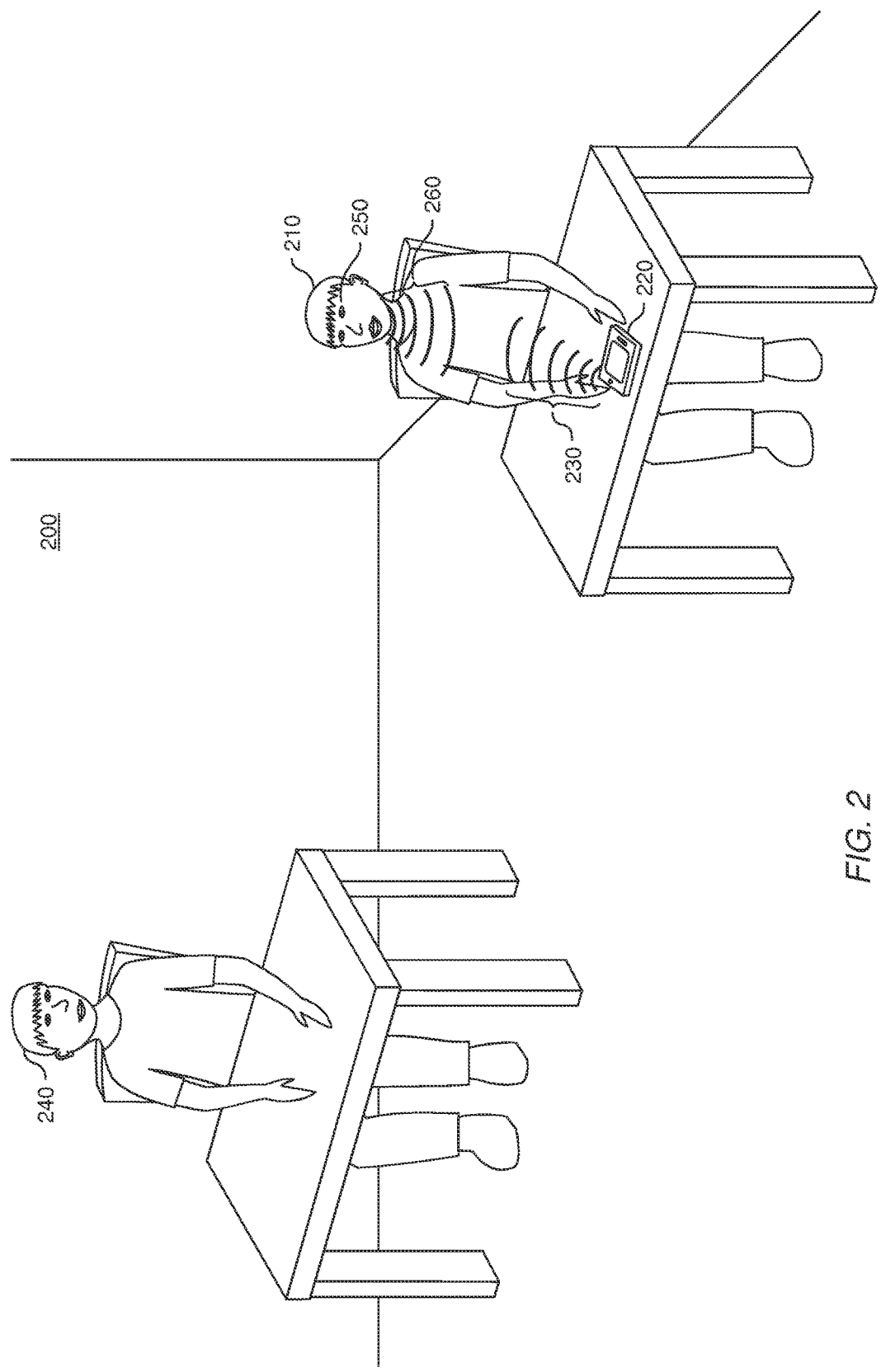
FIG. 2 depicts a physical environment in which a user is interacting with a hands-free device, according to one embodiment described herein.

An example will now be discussed with respect to FIG. 2, which depicts a physical environment in which a user is interacting with a hands-free device, according to one embodiment described herein. As shown, the environment 200 includes a first user 210 and a second user 240, and the first user 210 is shown interacting with a hands-free device 220 configured with a directional interaction component 120. For purposes of this example, assume that the hands-free device 220 is configured to remain in a sleep state (i.e., where the device 220 is not actively listening for and processing voice instructions) until the user 210 looks in the direction of the device 220.

In this example, the directional interaction component 120 could continuously capture an image(s) of the user 210 using a camera device(s) of the hands-free device 220. The directional interaction component 120 could then perform a facial recognition analysis of the captured images to identify the user's 210 face within the images, and the directional interaction component 120 could then determine whether the user's eyes 250 are currently looking in the direction of the hands-free device 220. This process could repeat until the directional interaction component 120 detects the user is looking in the direction of the hands-free device 220, at which point the hands-free device 220 on which the directional interaction component 120 is deployed could exit the sleep state. In one embodiment, the directional interaction component 120 may provide an acknowledgement that the sleep state has been broken (e.g., outputting an audible sound confirming the hands-free device 220 is now awake and listening for voice commands).

For purposes of this example, assume that the directional interaction component 120 has detected the user's eyes 250 looking directly at the hands-free device 220 (or substantially in the direction of the hands-free device 220) and has left the sleep state. Once the device 220 has left the sleep state, the user 210 has spoken a voice command to be carried out by the hands-free device, represented by the audio waves 260. As another example, the directional interaction component 120 could be configured to detect retinal reflection in order to detect the user's eye contact with the hands-free device. As yet another example, the directional interaction component 120 could also be configured to use one or more thermal sensors on the hands-free device in order to detect the user and the user making eye contact with the hands-free device. More generally, any technique suitable for determining when a user is looking in the direction of the hands-free device can be used, consistent with the functionality described herein.

As discussed above, the directional interaction component 120 can detect the voice command 260 using one or more microphone devices and can process the audio data recorded by the microphone devices to identify what the user is requesting. The directional interaction component 120 could then determine a response to the user request and can output the determined response in the direction of the user 210, relative to the position of the hands-free device 220.

For example, the directional interaction component 120 could determine that the user's voice instruction 260 is a request to retrieve weather forecast information for an upcoming day of the week. The directional interaction component 120 could then generate a query requesting weather forecast information and could transmit this query to a query processing component 140. The directional interaction component 120 could receive the query results and could determine an audible response to the voice instruction (e.g., by performing a text-to-speech conversion using at least a portion of the query results).

Additionally, the directional interaction component 120 could determine the direction the user 210 is located in, relative to the position of the device 220. Generally, any technique suitable for use in determining the user's 210 position relative to the position of the device 220 can be used, consistent with the functionality described herein. For example, the directional interaction component 120 could record the user's 210 voice instruction using multiple microphone devices and could extrapolate the user's 210 position relative to the position of the device 220 based on how loud the voice command is in each of the records, together with information specifying where the microphone devices are located on the hands-free device.

Once the directional interaction component 120 determines the direction the user is located in, the directional interaction component 120 can output the determined audible response in the determined direction using an ultra-directional speaker, as shown by the audio waves 230. Advantageously, by using an ultra-directional speaker, the directional interaction component 120 can output the audible response as a steerable beam of sound, such that only the user 210 and those in the user's 210 immediate vicinity can hear the audible response. Thus, in this example, the audible response 230 may be inaudible to the user 240, even though the users 210 and 240 are seated in the same room. Doing so avoids disturbing the user 240 with the playback of the audible response from the hands-free device 220 while also maintaining the user's 210 privacy by not outputting the audible response for the entire room to hear.

Figure 3:
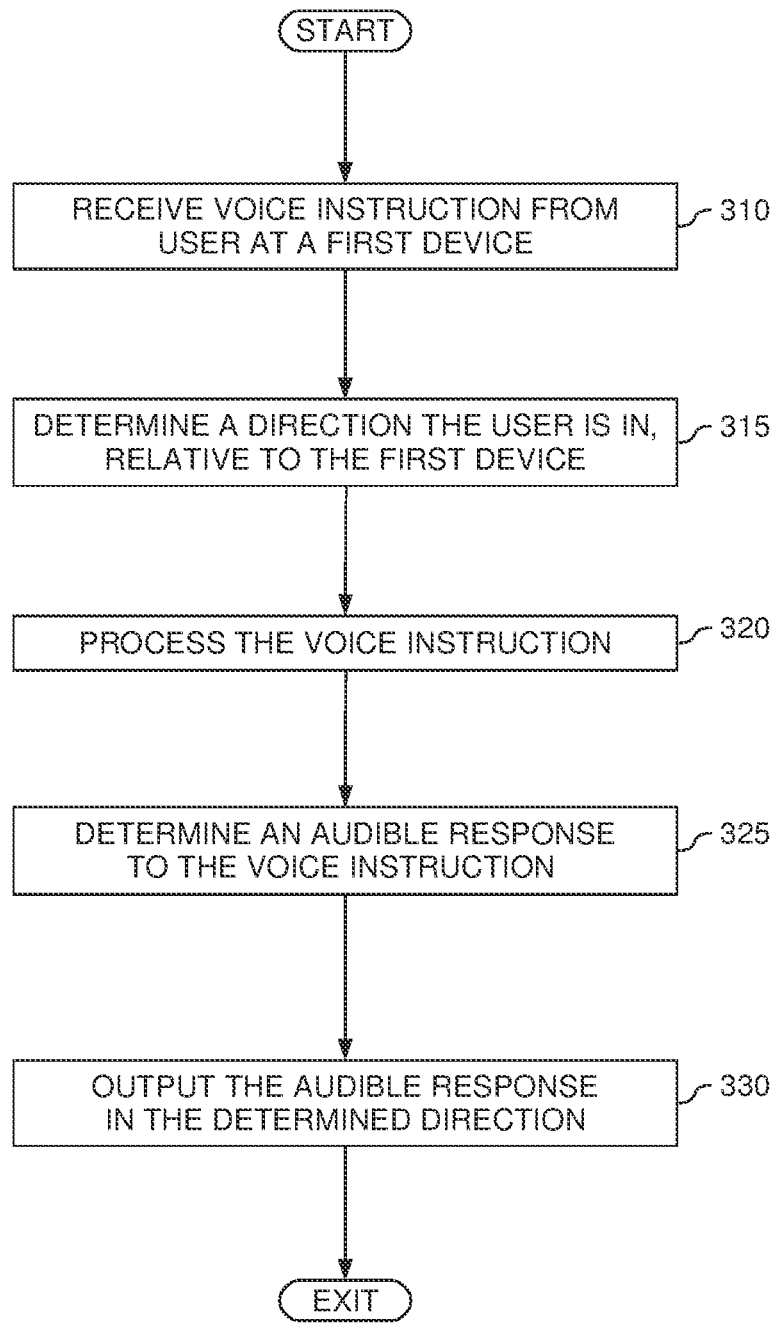
FIG. 3 is a flow diagram illustrating a method for processing a voice instruction at a hands-free device, according to one embodiment described herein.

FIG. 3 is a flow diagram illustrating a method for processing a voice instruction at a hands-free device, according to one embodiment described herein. As shown, the method 300 begins at block 310, where a directional interaction component 120 receives a voice instruction from a user at a first hands-free device. For example, the directional interaction component 120 could detect the voice command by analyzing data recorded by microphone devices of the hands-free device. In the event the voice command is recorded by multiple different microphone devices of the hands-free device, the directional interaction component 120 could select data recorded by one of the microphone devices to analyze in order to detect the voice instruction. In one embodiment, the directional interaction component 120 is configured to analyze the data from each of the microphone devices in detecting the voice instruction.

Upon receiving the voice instruction, the directional interaction component 120 determines a direction the user is located in, relative to a current position of the first device (block 315). For instance, the directional interaction component 120 could determine the direction from which the voice instruction was received and could determine that the user is located in the same direction. As an example, the directional interaction component 120 could analyze data from each of multiple microphones of the hands-free device and could use this data in conjunction with information about where each of the microphone devices are positioned on the hands-free device to determine the origin direction of the voice instruction. For instance, for the recorded data for each of the microphone devices, the directional interaction component 120 could determine that the user is more likely to be in the direction the respective microphone is oriented in if the voice command in the corresponding sound data is relatively loud, and could determine that the user is less likely to be in the direction the respective microphone is oriented in if the voice command in the corresponding sound data is relatively quiet. The directional interaction component 120 could repeat this process with the audio data captured from each of the microphone devices in order to extrapolate the user's position relative to the first device. Of note, such an embodiment could be configured with one or more microphones having a known sensitivity in a particular direction, as opposed to omnidirectional microphones which have roughly the same sensitivity in all directions. Doing so allows the directional interaction component 120 to use the known sensitivity of the microphone devices to determine the direction from which the voice command originated.

As another example, the directional interaction component 120 could determine the direction from which the voice command originated using sound source localization techniques based on microphone arrays. In such an embodiment, a microphone array could sense the direction of the incoming voice command by processing signals from the individual microphones within the microphone array. More generally, however, any technique for determining the direction in which the voice command originated can be used, consistent with the functionality described herein.

Additionally, the directional interaction component 120 processes the voice instruction to determine a user request specified by the voice instruction (block 320). For example, the directional interaction component 120 could perform a speech recognition analysis of the recorded voice instruction and could generate a textual string based on the speech recognition analysis. The directional interaction component 120 could then parse the textual string to determine the user request. Generally, the user request represents any command, question or other directive the user can give to the hands-free device. Examples of such user requests include, without limitation, explicit instructions to perform a particular action (e.g., an instruction to begin playing a particular playlist) and a question requesting a particular piece of information (e.g., a request for what is the weather will be like tomorrow, a question as to whether John will be available tomorrow at 2:00 pm, etc.).

The directional interaction component 120 then determines an audible response to the voice instruction (block 325). Generally, how the directional interaction component 120 determines the appropriate response for the voice instruction depends on the content of the voice instruction. For example, if the voice instruction specified to begin playing music from a particular playlist, the directional interaction component 120 could determine that an appropriate audible response is a brief confirmation of the request, followed by the playback of the requested music. As another example, if the voice instruction specified to determine what the weather forecast is for tomorrow, the directional interaction component 120 could generate a query configured to retrieve query results detailing tomorrow's weather forecast and, upon receiving the query results, could generate the audible response by applying a text-to-speech conversion to at least a portion of the query results.

The directional interaction component 120 then outputs the audible response in the determined direction (block 330), and the method 300 ends. For instance, the directional interaction component 120 could output the audible response as a steerable beam of sound that is aimed in the direction the user is located in, relative to the hands-free device. In order to accomplish this, the directional interaction component 120 could use a beam forming speaker array and/or one or more actuated directional speakers on the hands-free device, in order to focus the emitted audio waves in the direction of the user. That is, the directional interaction component 120 on the hands-free device could use parabolic reflectors to cause the audio waves coming from a loud speaker more directional, thereby focusing the emitted audio waves into a steerable beam of sound (e.g., oriented in the direction from which the voice command originated). By doing so, the directional interaction component 120 is able to output the audible response so that substantially only the user and others in his immediate vicinity can hear the audible response, allowing the user to more easily and more comfortably use the hands-free device without disturbing others.

Figure 4:
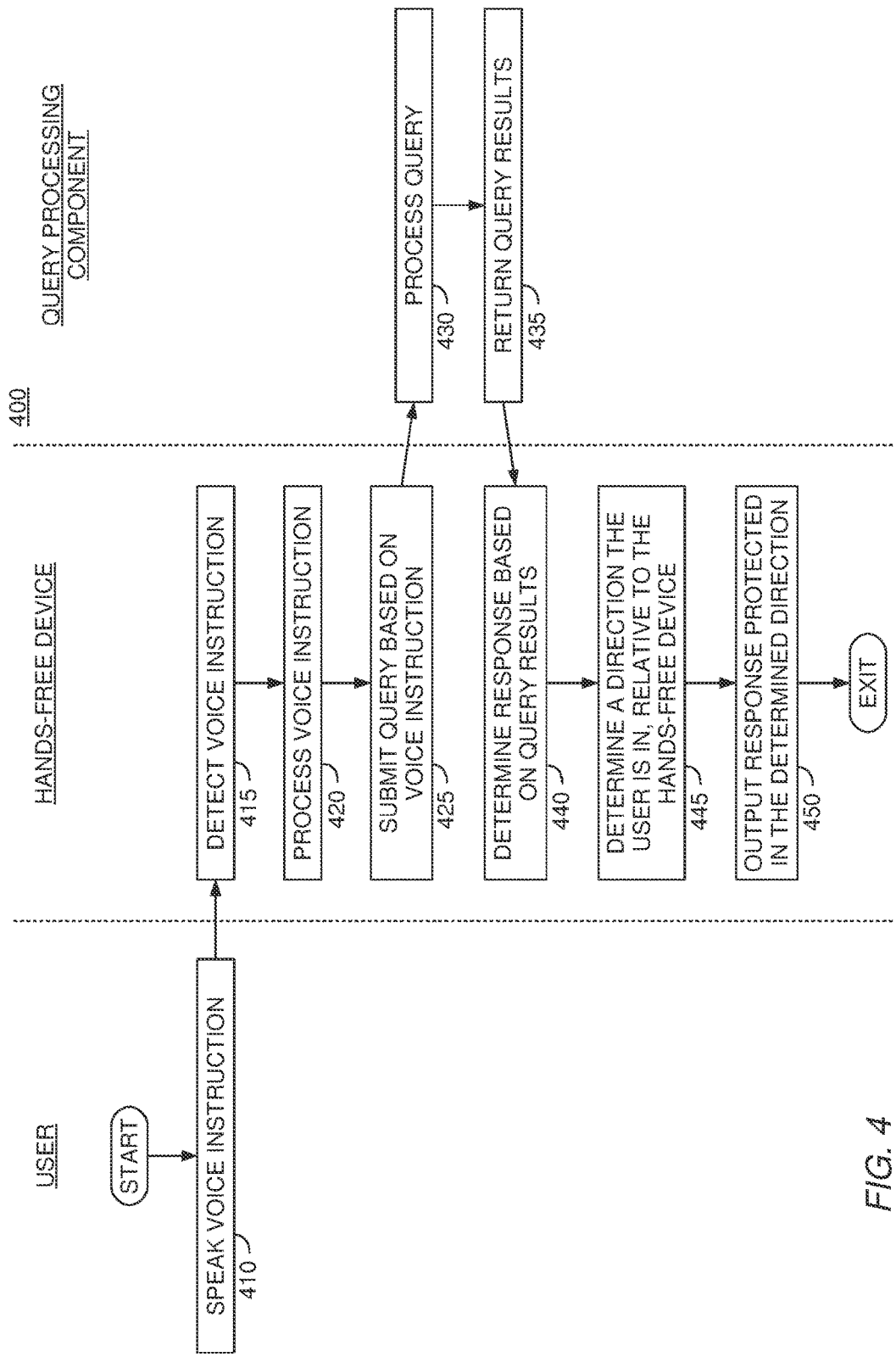
FIG. 4 is a flow diagram illustrating a method for processing a voice instruction at a hands-free device by submitting a query to a query processing component, according to one embodiment described herein.

FIG. 4 is a flow diagram illustrating a method for processing a voice instruction at a hands-free device by submitting a query to a query processing component, according to one embodiment described herein. As shown, the method 400 begins at block 410, where a user speaks a voice instruction requesting an action be performed by a hands-free device. The directional interaction component 120 detects the spoken voice instruction (block 415) and processes the voice instruction to determine (block 420). For example, the directional interaction component 120 could detect the spoken voice instruction using a plurality of microphone devices on the hands-free device, and the directional interaction component 120 could then process the audio data recorded by the microphone devices to interpret the voice instruction. As an example, the directional interaction component 120 could perform a speech recognition analysis of the recorded audio data in order to generate a string of text, and the directional interaction component 120 could then analyze the string of text in order to determine what the spoken voice instruction is requesting.

In this example, assume that the user has asked the hands-free device what the weather report looks like for tomorrow. Upon processing the voice instruction to determine that the user is asking about tomorrow's weather, the directional interaction component 120 generates a query based on the voice instruction and submits the query for execution (block 425). In this embodiment, the query is received by a query processing component which processes the query to produce query results (block 430) and then returns the query results to the hands-free device (block 435). For example, the query processing component could represent a web application executing in a cloud computing environment that is capable of receiving and processing queries.

In one embodiment, the query processing component represents logic executing on the hands-free device itself. For example, in such an embodiment, the query processing component could process the query by executing a search using an Internet search engine and then processing the results of the search (e.g., one or more web pages returned by the search engine) in order to generate the query results. For instance, the query processing component could be configured to extract pertinent weather information from the web page(s) returned by the search engine and could return the weather information as the query results.

The directional interaction component 120 then receives the query results and determines a response based on the query results (block 440). For instance, in this example, the directional interaction component 120 could determine an audible response that provides the user with a summary of tomorrow's weather forecast. The directional interaction component 120 also determines a direction the user is located in, relative to the current position of the hands-free device (block 445). For example, the directional interaction component 120 could determine the user's position based the audio data recorded by the microphone devices of the hands-free device when the user spoke the voice instruction, and could extrapolate the direction in which the user is located relative to the device based on the loudness of the voice instruction in each of the microphone as well as information specifying where each of the microphones is positioned on the hands-free device. As another example, the directional interaction component 120 could capture images using various camera devices on the hands-free device and the directional interaction component 120 could identify the user's face within at least one of the captured images. The directional interaction component 120 could then determine the direction of the user, based on the position of the user's face within the image(s) and information specifying the respective positions of the various camera devices. Of course, such examples are provided for illustrative purposes only and without limitation. More generally, any technique for determining the direction in which the user is located relative to the position of the hands-free device can be used, consistent with the functionality described herein.

Once the direction is determined, the directional interaction component 120 outputs the response projected in the determined direction (block 450) and the depicted iteration of the method 400 is completed. Of course, it can be appreciated that any number of iterations of the method 400 could be performed, or the process could continue on, e.g., as the directional interaction component 120 detects further voice instructions from the user.

As discussed above, the directional interaction component 120 could use one or more audio output devices of the hands-free device in order to output the response as a steerable beam of sound that is aimed in the determined direction. Examples of such audio output devices include a beam forming speaker array and one or more actuated directional speakers within the hands-free device. Moreover, it is contemplated that the directional interaction component 120 can output the determined response using directional speakers that are mounted on a separate hardware component from the hands-free device and/or that are worn on the user's body (e.g., a body-worn directional speaker(s)).

Moreover, beyond projecting an audible response in the determined direction, the directional interaction component 120 can be configured to provide other directional outputs, in addition to or in lieu of said audible response. For example, the directional interaction component 120 could be configured to provide a visual response to the user's request using, e.g., a steerable micro projector which could be used to project visual content (e.g., text, images, video, etc.) in a way that is visible to the user. Here, the directional interaction component 120 could orient the projection based on the determined direction in which the user is located, relative to the hands-free device. In one embodiment, the directional interaction component 120 is configured to determine a position at which to project the visual content based on the direction in which the user is located and further based on a plurality of surfaces available in the proximate physical environment, where the directional interaction component 120 is configured to select one of the plurality of surfaces suitable for the projection and determined to be within the user's field of vision.

In one embodiment, the directional interaction component 120 can detect the user is wearing an in-ear or on-ear audio device such as ear buds, headsets, headphones, in-ear monitors, in-ear hearing aids, in-ear audio enhancers, and so on. In such an embodiment, rather than projecting the response as a steerable beam of sound in the direction of the user, the directional interaction component 120 could transmit the response audio to the user's headset. By doing so, the directional interaction component 120 helps ensure that the user hears the projected audio response and also reduces that chance of other people in the user's vicinity hearing the audible response. Thus, the directional interaction component 120 can avoid disturbing other people in the user's vicinity with the output of the determined response, while also improving the security of the system (e.g., in the event the user does not wish others to overhear the audible response).

Figure 5:
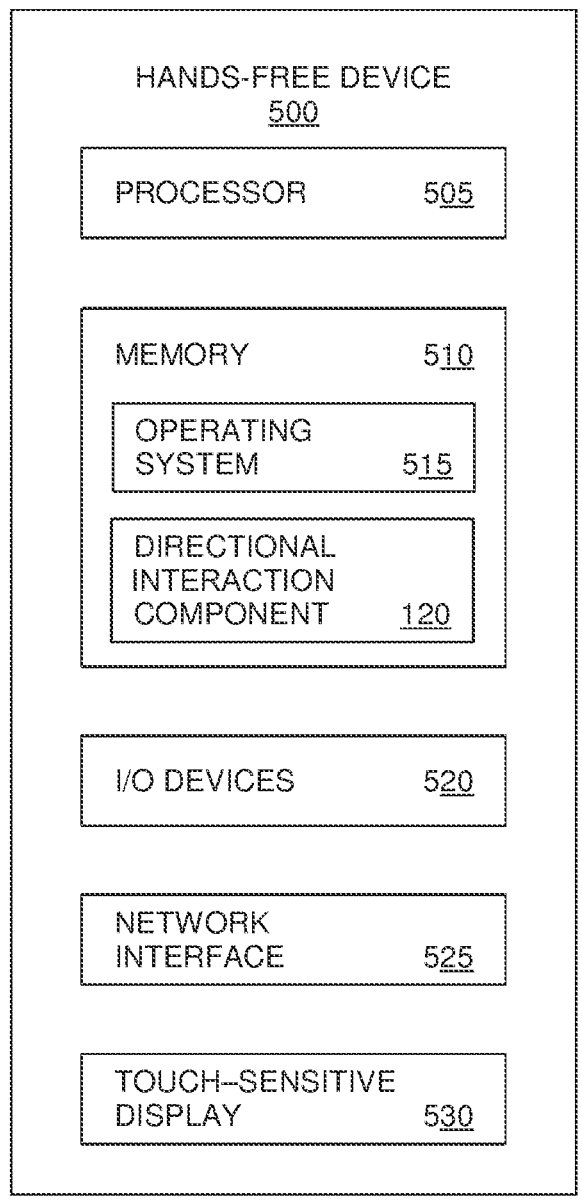
FIG. 5 is a block diagram illustrating a hands-free device configured with a directional interaction component, according to one embodiment described herein.

FIG. 5 is a block diagram illustrating a hands-free device configured with a directional interaction component, according to one embodiment described herein. In this example, the hands-free device 500 includes, without limitation, a processor 505, memory 510, I/O devices 520, a network interface 525 and a touch-sensitive display device 530. Generally, the processor 505 retrieves and executes programming instructions stored in the memory 510. Processor 505 is included to be representative of a single CPU, multiple CPUs, a single CPU having multiple processing cores, GPUs having multiple execution paths, and the like. The memory 510 is generally included to be representative of a random access memory. The network interface 525 enables the hands-free device 500 to connect to a data communications network (e.g., wired Ethernet connection or an 802.11 wireless network). The device 500 may further include a Bluetooth transceiver module for use in communicating with other devices. Further, while the depicted embodiment illustrates the components of a hands-free device 500, one of ordinary skill in the art will recognize that embodiments may use a variety of different hardware architectures. Moreover, it is explicitly contemplated that embodiments may be implemented using any device or computer system capable of performing the functions described herein.

The memory 510 represents any memory sufficiently large to hold the necessary programs and data structures. Memory 510 could be one or a combination of memory devices, including Random Access Memory, nonvolatile or backup memory (e.g., programmable or Flash memories, read-only memories, etc.). In addition, memory 510 may be considered to include memory physically located elsewhere; for example, on another computer or device communicatively coupled to the hands-free device 500. Illustratively, the memory 510 includes an operating system 515 and a directional interaction component 120. The operating system 515 generally controls the execution of application programs on the device 500. Examples of operating system 515 include UNIX, a version of the Microsoft Windows® operating system, and distributions of the Linux® operating system. Additional examples of operating system 515 include custom operating systems for gaming consoles, including the custom operating systems for systems such as the Nintendo DS® and Sony PSP®, as well as operating systems configured for mobile devices such as Apple iOS®.

The I/O devices 520 represent a wide variety of input and output devices, including displays, keyboards, touch screens, and so on. For instance, the I/O devices 520 may include a set of buttons, switches or other physical device mechanisms for controlling the device 500. For example, the I/O devices 520 could include a set of directional buttons used to control aspects of a video game played using the device 500. In the context of the present disclosure, the I/O devices 520 can include at least one audio output device configured to project a steerable beam of sound. Examples of such I/O devices 520 include a beam forming speaker array and an actuated directional speaker. More generally, however, any device capable of projecting a directional beam of sound can be used, consistent with the present disclosure. Additionally, as discussed above, some embodiments may project visual content, in addition to or in lieu of an audio projection. For example, such an embodiment could be configured with a steerable micro projector capable of projecting visual content into the physical environment. More generally, however, any device capable of projecting visual content can be used. Moreover, the I/O devices 520 can include a camera device(s) and microphone(s), for use in detecting user actions and for determining a direction the user is located in, relative to the device 500. The touch-sensitive display 530 can be used for outputting a graphical user interface for the device 500 (e.g., an interface generated by the operating system 515) and can also be used to detect gestures performed by a user of the device 500.

As discussed above, the directional interaction component 120 can be configured to detect an action performed by a first user. Examples of such an action can include, for instance, an audible phrase spoken by the user and the user gazing in the direction of the device 500. The directional interaction component 120 could determine a direction in which the first user is located, relative to a current position of the apparatus. For example, the directional interaction component 120 could use I/O devices 520 (e.g., cameras, microphones, etc.) in conjunction with information specifying where such I/O devices 520 are physically located on the hands-free device, to determine the direction from which the user action was received. The directional interaction component 120 can also determine an audible response to the user action. For example, the directional interaction component 120 could determine that an audible phrase spoken by the user is a request asking what the weather will be like tomorrow, and the directional interaction component 120 could issue a query to retrieve weather information associated with tomorrow's date and could generate an audible response (e.g., using a text-to-speech synthesizer) to present this weather information to the user. The directional interaction component 120 could then output the determined audible response using the I/O devices 520 as a steerable sound beam in the determined direction in which the first user is located. Doing so provides a truly hands-free experience for the user of the device 500.

In the preceding, reference is made to embodiments of the invention. However, it should be understood that the present disclosure is not limited to specific described embodiments. Instead, any combination of the aforementioned features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the present disclosure. Thus, the aforementioned aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, the aspects described herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the aspects described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, the directional interaction component 120 could generate a query based on a voice command spoken by a user and could submit the generated query to a query processing component executing in a cloud computing environment. The directional interaction component 120 could then receive the query results from the query processing component and could generate an audible response to output for the user, based on at least a portion of the query results. Doing so allows a user to submit queries from any computing device attached to a network connected to the cloud (e.g., the Internet) in a truly hands-free manner.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium containing instructions that, when executed by a processor, cause the processor to perform the steps of:
   detecting a hands-free user action requesting an interaction with a first device and originating from a source;
   determining a direction in which the source is located relative to a current position of the first device;
   determining a response to the hands-free user action based on a current state of the first device; and
   outputting the determined response as a steerable sound beam substantially in the determined direction in which the source is located.

2. The non-transitory computer-readable medium of claim 1, wherein the response comprises an audible response, and wherein the response is output from the first device as a steerable beam of sound oriented in the determined direction in which the source location is located.

3. The non-transitory computer-readable medium of claim 2, wherein detecting the hands-free user action requesting the interaction with the first device comprises:
   detecting, by operation of one or more sensor devices of the first device, that a user gaze is substantially oriented in the direction of the first device, comprising:
   capturing one or more images that include the source;
   analyzing the captured one or more images to identify a face within one of the one or more images; and
   determining whether the user gaze is substantially oriented in the direction of the first device, based on the identified face within the one or more images.

4. The non-transitory computer-readable medium of claim 1, wherein the response comprises one or more frames, and wherein outputting the determined response substantially in the determined direction in which the source is located further comprises:
   determining a physical surface within a viewing range of the source; and projecting the one or more frames onto the physical surface, using a projector device of the first device.

5. The non-transitory computer-readable medium of claim 1, wherein the hands-free user action comprises a voice command, and the operation further comprising:
analyzing the voice command to determine a user request corresponding with the voice command; and
processing the user request to produce a result,
wherein the determined response provides at least an indication of the produced result.

6. The non-transitory computer-readable medium of claim 5, wherein processing the user request to produce the result further comprises generating an executable query based on the user request, and wherein processing the user request to produce the result further comprises executing the executable query to produce query results, and wherein determining the response to the hands-free user action is performed using a text-to-speech synthesizer based on text associated with at least a portion of the query results.

7. The non-transitory computer-readable medium of claim 1, wherein the direction in which the source is located is determined via at least one of a microphone and an image sensor, and the response is outputted via one or more directional loudspeakers.

8. A non-transitory computer-readable medium containing instructions that, when executed by a processor, cause the processor to perform the steps of:
detecting a triggering event comprising at least one of:
detecting a voice trigger; and
detecting a user gaze in a direction of a first device;
determining a direction to a source of the triggering event relative to a current position of the first device; and
initiating an interactive voice dialogue by outputting an audible response as a steerable sound beam substantially in the determined direction in which the source of the triggering event is located.

9. The non-transitory computer-readable medium of claim 8, the operation further comprising:
detecting, by operation of one or more sensors of the first device, that the user gaze is oriented in the direction of the first device.

10. The non-transitory computer-readable medium of claim 8, the operation further comprising:
analyzing the voice trigger to determine a user request corresponding with the voice trigger; and
processing the user request to produce a result,
wherein the determined audible response provides at least an indication of the produced result.

11. The non-transitory computer-readable medium of claim 10, wherein processing the user request to produce the result further comprises generating an executable query based on the user request, and wherein processing the user request to produce the result further comprises executing the executable query to produce query results, and wherein determining an audible response to the hands-free user action is performed using a text-to-speech synthesizer based on text associated with at least a portion of the query results.

12. The non-transitory computer-readable medium of claim 8, the operation further comprising:
capturing one or more images that include a depiction of the source of the triggering event using one or more sensor devices of the first device; and
authenticating the source of the triggering event based on a comparison of at least a portion of the captured one or more images and a predefined image.

13. The non-transitory computer-readable medium of claim 8, the operation further comprising:
authenticating the source of the triggering event based on a comparison of the voice trigger and a predefined voice recording.

14. The non-transitory computer-readable medium of claim 8, wherein the triggering event is detected via at least one of a microphone and an image sensor, and the audible response is outputted via one or more directional loudspeakers.

15. An apparatus, comprising:
a computer processor;
a memory containing a program that, when executed by the computer processor, causes the computer processor to perform the steps of:
detecting a hands-free user action originating from a source;
determining a direction in which the source is located relative to a current position of the apparatus;
determining a response to the hands-free user action; and
outputting the determined response as a steerable sound beam substantially in the determined direction in which the source is located.

16. The apparatus of claim 15, wherein the response is outputted via a beam-forming speaker array.

17. The apparatus of claim 15, wherein the response is outputted via one or more actuated directional speakers.

18. The apparatus of claim 15, the operation further comprising:
upon detecting that a connection with a body-mounted audio output device associated with the source of the triggering event is available, outputting the determined response over the connection for playback using the body-mounted audio output device.

19. The apparatus of claim 15, wherein determining the direction in which the source is located, relative to a current position of the apparatus, further comprises:
capturing, via a first sensor of the apparatus, one or more images;
processing the one or more images to identify the source; and
determining the direction in which the source is located based on a location of the source within the one or more images and a position of the first sensor.

20. The apparatus of claim 15, the operation further comprising:
capturing, via one or more sensors, one or more images including the source; and
authenticating the source by comparing at least a portion of the one or more images to a predefined image of a user.

21. The apparatus of claim 20, wherein comparing the at least a portion of the one or more images to the predefined image comprises performing facial recognition on the at least a portion of the one or more images and the predefined image of the user.

22. The apparatus of claim 20, wherein comparing the at least a portion of the one or more images to the predefined image comprises performing a retinal scan on the user.

* * * * *